United States Patent
Bidaralli et al.

(10) Patent No.: US 9,806,952 B2
(45) Date of Patent: Oct. 31, 2017

(54) SYSTEM AND METHOD FOR GROUP-POLICY-BASED CONFIGURATION

(71) Applicant: Dell Products L.P., Round Rock, TX (US)

(72) Inventors: Santosh Kumar Bidaralli, Round Rock, TX (US); Lokesh Krishna Bangera, Round Rock, TX (US); Chandrasekhar Mugunda, Austin, TX (US); Yogesh Prabhakar Kulkarni, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 163 days.

(21) Appl. No.: 14/622,581

(22) Filed: Feb. 13, 2015

(65) Prior Publication Data

US 2016/0241443 A1 Aug. 18, 2016

(51) Int. Cl.
*H04L 12/24* (2006.01)

(52) U.S. Cl.
CPC ...... *H04L 41/0893* (2013.01); *H04L 41/0813* (2013.01); *H04L 41/0889* (2013.01); *H04L 41/0843* (2013.01)

(58) Field of Classification Search
None
See application file for complete search history.

(56) References Cited

U.S. PATENT DOCUMENTS

| | | | | |
|---|---|---|---|---|
| 2008/0287058 | A1* | 11/2008 | Nahm | G06F 8/65 455/3.02 |
| 2014/0355048 | A1* | 12/2014 | Kang | G06F 3/1292 358/1.15 |

OTHER PUBLICATIONS

Bidaralli et al., U.S. Appl. No. 14/497,303, titled Event Notification in a Shared Infrastructure Environment, filed Sep. 25, 2014, 35 pages.

Rao et al., U.S. Appl. No. 14/509,014, titled Master Baseboard Management Controller Election and Replacement Sub-System Enabling Decentralized Resource Management Control, filed Oct. 7, 2014, 28 pages.

* cited by examiner

*Primary Examiner* — Christine Duong
(74) *Attorney, Agent, or Firm* — Baker Botts L.L.P.

(57) ABSTRACT

A system includes a processor of a first node, which is one of a plurality of nodes governed by a group policy. The processor is operable to transmit, using an interface, a first request to receive information associated with the plurality of nodes and receive, using the interface, sets of configuration information associated with the plurality of nodes after a change has occurred regarding the plurality of nodes. The processor is further operable to compare the sets of configuration information associated with the plurality of nodes to the configuration information associated with the first node and determine a difference. In response, the processor is operable to determine, based on the group policy, to configure the first node. The processor is additionally operable to determine a second node that stores a set of files to configure the first node and configure the first node using the set of files.

23 Claims, 4 Drawing Sheets

Policy  200a

Group ID: IT
Component Class: All
Firmware Update: Sync with Master
Config. Update: Sync with Master
URI: Empty

Policy  200b

Group ID: Finance
Component Class: IDRAC
Firmware Update: Latest
Config. Update: Keep Current
URI: ftp://custuri.idrac.com

Policy  200c

Group ID: Finance
Component Class: NIC
Firmware Update: Sync with Master
Config. Update: Latest
URI: ftp://custuri.nic.com

*FIG. 2*

SYSTEM AND METHOD FOR GROUP-POLICY-BASED CONFIGURATION

TECHNICAL FIELD

This disclosure relates generally to information handling systems and more particularly to a system and method for group-policy-based configuration.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Certain information handling systems require components of nodes to be shared across nodes in a chassis. There exist challenges to ensuring that these shared components are updated and configured in the correct manner

SUMMARY

In one embodiment, a method includes transmitting, from a first node, a first request to receive information associated with a plurality of nodes. The first node is one of the plurality of nodes and the plurality of nodes are governed by a group policy. The method additionally includes receiving, at the first node, sets of configuration information associated with the plurality of nodes. The sets of configuration information are received after a change has occurred regarding the plurality of nodes. The method also includes comparing the sets of configuration information associated with the plurality of nodes to configuration information associated with the first node and determining a difference between the sets of configuration information associated with the plurality of nodes and the configuration information associated with the first node. In response to determining the difference, the method further includes determining, based on the group policy, to configure the first node. The method also includes determining a second node that stores a set of files to configure the first node. The second node is one of the plurality of nodes. The method finally includes configuring the first node using the set of files stored at the second node.

In one embodiment, a system includes a processor of a first node. The first node is one of a plurality of nodes and the plurality of nodes are governed by a group policy. The processor is operable to transmit, using an interface, a first request to receive information associated with the plurality of nodes. The processor is additionally operable to receive, using the interface, sets of configuration information associated with the plurality of nodes. The sets of configuration information are received after a change has occurred regarding the plurality of nodes. The processor is further operable to compare the sets of configuration information associated with the plurality of nodes to configuration information associated with the first node and determine a difference between the sets of configuration information associated with the plurality of nodes and the configuration information associated with the first node. In response to determining the difference, the processor is operable to determine, based on the group policy, to configure the first node. The processor is additionally operable to determine a second node that stores a set of files to configure the first node. The second node is one of the plurality of nodes. The processor is further operable to configure the first node using the set of files stored at the second node.

Certain embodiments of the present disclosure may provide one or more technical advantages. In a shared infrastructure environment, a chassis may pool its resources and spread them among nodes within the chassis to achieve optimized performance. Thus, some components may be shared across different nodes. For the chassis to work more efficiently in this heterogeneous environment, it can be beneficial for all of the same type of components and devices on individual nodes to have the same configuration and firmware. By creating groups of nodes all governed by the same policy, the system triggers firmware and configuration update actions based on changes that have occurred in other nodes of the same group. When a component of a node or a node itself is replaced, the system allows for all of the nodes in the group to be compare configuration information and update themselves to facilitate consistent configuration among the nodes and components of the nodes. This approach, in some embodiments, allows updates to occur in a one-to-many fashion: if one node is updated by an administrator of a system, then the other nodes may be similarly updated depending on the instructions of the group policy without the administrator needing to manually update each node or component of the system.

The system allows effective and efficient management of nodes and infrastructure. By using group policies to trigger actions, the system facilitates similar or the same configuration among nodes of the same group. For example, if a first node fails or is powered down, a second node may take over the actions performed by the first node. Because the first node and second node are kept in a similar or same configuration using the techniques disclosed herein, a user or administrator of the system would not be able to detect a difference in operation.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Reference is now made to the following description taken in conjunction with the accompanying drawings, wherein like reference numbers represent like parts.

FIG. 2 illustrates examples of group policies governing nodes in the system of FIG. 1.

DETAILED DESCRIPTION

Figure 1:
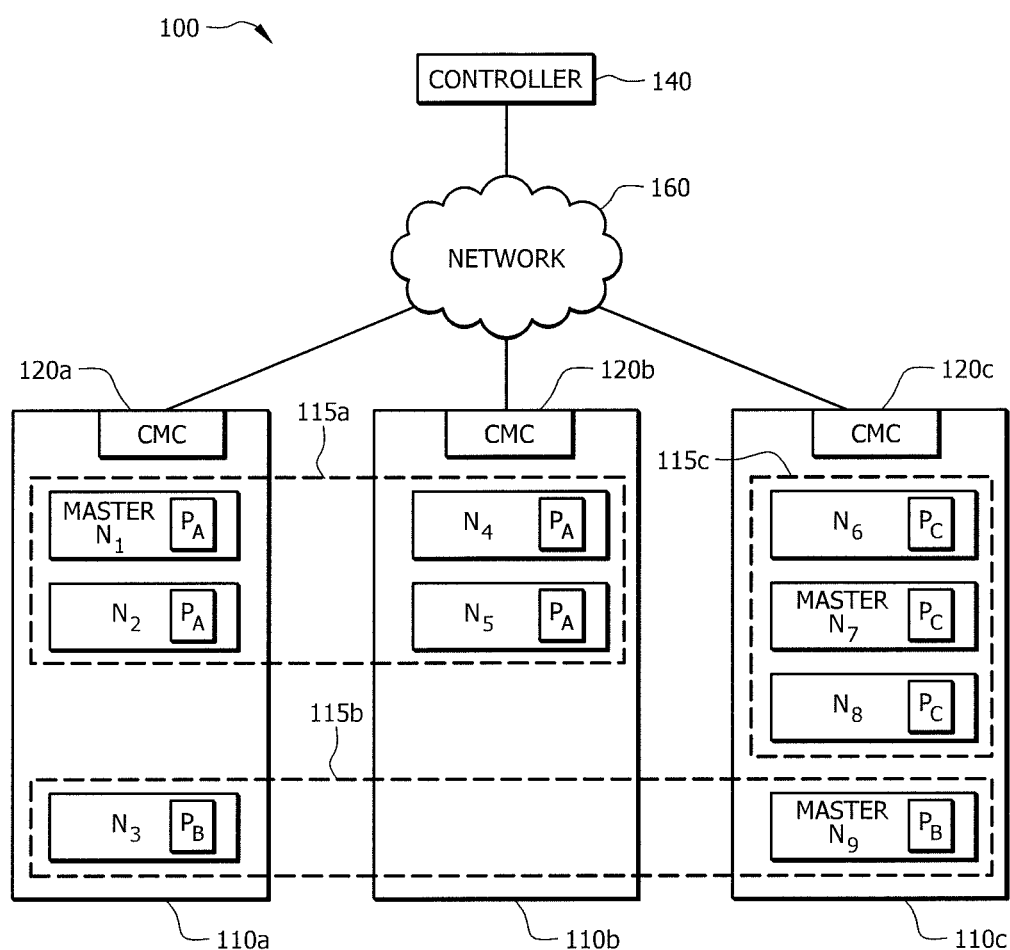
FIG. 1 is a block diagram of a system in accordance with some embodiments of the present disclosure.

FIG. 1 is a block diagram of system 100 in accordance with some embodiments of the present disclosure. In particular embodiments, system 100 may include one or more controllers 140 and one or more chassis 110a-c coupled to network 160. Chassis 110a-c may include a plurality of nodes $N_1$-$N_9$ and chassis management controllers (CMCs) 120a-c, which may communicate with controller 140 via network 160. Nodes $N_1$-$N_9$ are included in groups 115a-c. Each group 115a-c may be governed by group policies $P_A$-$_C$, respectively. Depending on the grouping of nodes $N_1$-$N_9$, each node of nodes $N_1$-$N_9$ may include one or more of group policies $P_A$-$_C$. Nodes $N_1$-$N_9$ may also comprise configuration information detailing, e.g., the firmware and configuration of the node. A first node (e.g., one of nodes $N_1$-$N_9$) is configured to receive configuration information associated with nodes $N_1$-$N_9$. Configuration information can include one or more of lists of components, lists of versions of software, lists of versions of firmware of one or more components, or any other suitable information describing how a node or its components are configured. The configuration information is received after a change has occurred regarding the plurality of nodes. The first node is further operable to compare the configuration information associated with nodes $N_1$-$N_9$ to configuration information associated with the first node (e.g., one of nodes $N_1$-$N_9$) and determine a difference between the configuration information associated with nodes $N_1$-$N_9$ and the configuration information associated with the first node. In response to determining the difference, the first node is operable to determine, based on group policies $P_A$-$_C$, to configure (e.g., update) the first node. The first node is additionally operable to determine a second node (e.g., one of nodes $N_1$-$N_9$) that stores a set of files to configure the first node. The first node is further operable to configure the first node using the set of files stored at the second node.

Network 160, in some embodiments, may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network 160 and its various components may be implemented using hardware, software, or any combination thereof. Network 160 is configured such that controller 140 and CMCs 120a-c may communicate with or access information in system 100, or particular components of system, such as nodes $N_1$-$N_9$. Although FIG. 1 illustrates one network 160, it should be understood that any number of networks may be included.

Figure 4:
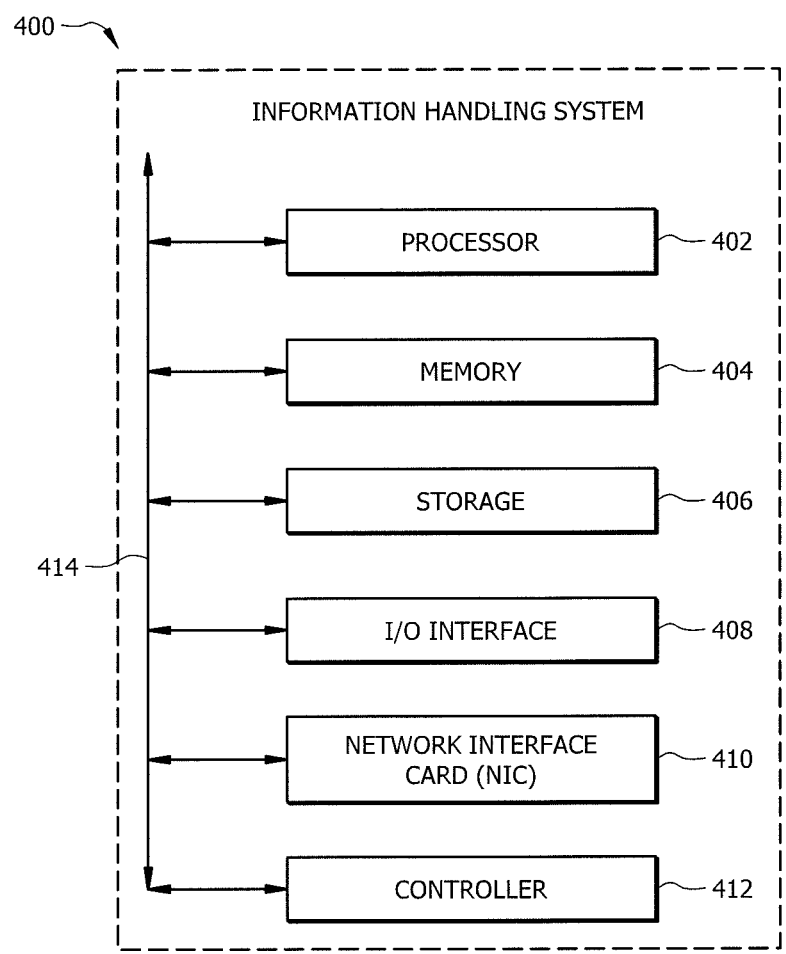
FIG. 4 is a block diagram of selected elements of an embodiment of information handling system 100, in accordance with some embodiments of the present disclosure.

Chassis 110a-c may be a blade server chassis configured to house multiple nodes $N_1$-$N_9$. Nodes $N_1$-$N_9$ may be implemented using descriptions below related to FIG. 4. As shown in FIG. 4, each of nodes $N_1$-$N_9$ may include one or more components (e.g., processor 402, memory 404, storage 406, I/O interface 408, network interface card (NIC) 410, controller 412). Although FIG. 1 depicts nine nodes (three nodes in chassis 110a, two nodes in chassis 110b, and four nodes in chassis 110c), chassis 110a-c may be configured to house a larger or smaller number of nodes than are depicted. Chassis 110a-c may include CMCs 120a-c, respectively. Each of CMCs 120a-c may be coupled to controller 140 by network 160.

In some embodiments, a group may include a plurality of nodes. In some embodiments, the groups may be governed by one or more policies (e.g., $P_A$-$_C$) The groups may be created based on any common characteristics of the nodes, such as a common line of business (e.g., Finance, Information Technology, Human Resources), a common chassis 120a-c, or any other suitable characteristic that can be used to determine that one or more of the nodes should be grouped together and/or governed by the same policy (e.g., one of policies $P_A$-$_C$). In some embodiments, a group can include nodes that are housed in the same chassis. For example, group 115c includes nodes $N_6$, $N_7$, and $N_8$ that are all housed in chassis 110c. In some embodiments, a group can include nodes that span across multiple chassis. For example, group 115b includes nodes $N_3$ and $N_9$, housed within chassis 110a and chassis 110c, respectively.

In some embodiments, each of groups 115a-c comprise a master node (e.g., master nodes $N_1$, $N_7$, and $N_9$). The master nodes may be selected by an administrator of system 100.

CMCs 120a-c and controller 140 may be implemented using any suitable device, system, or apparatus configured to monitor and/or manage one or more aspects of system 100. For example, CMCs 120a-c and controller 140 may be a DELL POWEREDGE M1000e CHASSIS MANAGEMENT CONTROLLERS or a DELL POWERCONNECT W-6000 CONTROLLER. CMCs 120a-c and/or controller 140 may be configured to issue commands and/or other signals to manage and/or control system 100 and/or components of system 100. In some embodiments, CMCs 120a-c and/or controller 140 receive event subscription information from nodes $N_1$-$N_9$, the event subscription information indicating a desire for a node to receive event updates regarding nodes $N_1$-$N_9$. For example, node $N_6$ may send a request to receive event updates regarding nodes $N_7$ and $N_8$, which are all a part of group 115c. CMCs 120a-c and/or controller 140 may store the subscription (e.g., that node $N_6$ should receive event updates regarding nodes $N_7$ and $N_8$) in a list, lookup table, database, or other suitable data structure.

In some embodiments, CMCs 120a-c and/or controller 140 may be configured to receive notifications from nodes $N_1$-$N_9$ or be configured to detect when a change has occurred in one of nodes $N_1$-$N_9$. A change in nodes $N_1$-$N_9$ may include adding a node, removing a node, replacing a node, updating the firmware of a node or of one of its components, updating the configuration of a node or of one of its components, and any other suitable alteration of a node that affects system 100. In some embodiments, nodes $N_1$-$N_9$ send event notifications to CMCs 120a-c and/or controller 140 when a change occurs. The event notification may notify CMCs 120a-c and/or controller 140 that a change occurred, what change occurred, provide configuration information of the changed node, or provide any suitable information regarding the change. CMCs 120a-c and/or controller 140 are configured to broadcast notifications in response to either detecting a change in one of nodes $N_1$-$N_9$ or receiving an event notification from one of nodes $N_1$-$N_9$ or their components.

In some embodiments, CMCs 120a-c and/or controller 140 may broadcast notifications to nodes $N_1$-$N_9$ indicating that a change has occurred in nodes $N_1$-$N_9$. For example, node $N_2$ may transmit event subscription information to controller 140 requesting to receive updates regarding changes to nodes $N_1$, $N_4$, and $N_5$ in group 115a. Continuing the example, after receiving an event notification from one of the nodes in group 115a (which includes nodes $N_1$, $N_2$, $N_4$, and $N_5$) indicating that a change has occurred or after detecting that a change has occurred in one of the nodes in group 115a, controller 140 may broadcast notifications to nodes $N_1$, $N_2$, $N_4$, and $N_5$ of group 115a. These broadcast notifications may include an indication that a change has occurred, information about the change that has occurred, configuration information of the nodes in the same group, and/or any suitable information nodes $N_1$-$N_9$ may use to facilitate their configuration.

In some embodiments, CMCs 120a-c are configured to receive event subscription information and broadcast notifications. For example, CMC 120c may handle the requests and broadcasts for group 115c because all of the nodes of that group are in chassis 110c. In some embodiments, controller 140 is configured to receive event subscription information and broadcasts notifications. For example, controller 140 may handle the requests and broadcasts for group 115a because the nodes in that group are in two different chassis—chassis 110a and chassis 110b.

In some embodiments, groups 115a-c may have corresponding group policies $P_A$-$_C$ stored on nodes $N_1$-$N_9$. For example, policy $P_A$ may correspond to group 115a and may govern nodes $N_1$, $N_2$, $N_4$, and $N_5$. As another example, policy $P_B$ may correspond to group 115b and may govern nodes $N_3$ and $N_9$. As an additional example, policy $P_C$ may correspond to group 115c and may govern nodes $N_6$, $N_7$, and $N_8$. In some embodiments, a group policy includes information regarding the group and instructions regarding how nodes in the group should configure themselves (e.g., update their configuration and firmware or the configuration and firmware of their components). For example, a group policy may instruct nodes to configure themselves by ensuring that the node has the same configuration as another node of the group (e.g., master nodes $N_1$, $N_7$, and $N_9$ or the most recently updated or configured node). As an additional example, group policies $P_A$-$_C$ may instruct nodes $N_1$-$N_9$ to not update themselves and not change their configuration (e.g., "keep current"). Group policies $P_A$-$_C$ may also include information on where a set of files is stored that can provide an update to match the current configuration of nodes $N_1$-$N_9$.

Examples of group policies $P_A$-$_C$ are shown in FIG. 2 as policies 200a-c. Policy 200a may be an example of policy $P_A$, which governs nodes $N_1$, $N_2$, $N_4$, and $N_5$ of group 115a. Policies 200a-c may each include a Group ID, a component class, a firmware update command, a configuration update command, a uniform resource identifier (URI), and/or any other suitable information about groups 115a-c and/or nodes $N_1$-$N_9$ or about configuring groups 115a-c and/or nodes $N_1$-$N_9$. A Group ID may identify the group that the policy governs. For example, policy 200a has an Information Technology (IT) Group ID, which may represent a group of nodes used by the IT section of a company and/or organization. As another example, policies 200b-c both have a Finance Group ID, which may represent a group of nodes used by the Finance section of a company and/or organization. A Component Class may identify the components of nodes that a policy applies to. For example, policy 200b applies to integrated Dell Remote Access Controller (iDRAC) components of nodes in the Finance group and policy 200c applies to network interface card (NIC) components of nodes in the Finance group. "Firmware Update" and "Configuration Update" fields indicate instructions that nodes should follow when updating and/or configuring themselves. The instructions may be indicated by the phrases "sync with master," "latest," "keep current," and any other instructions that indicate an action nodes $N_1$-$N_9$ should take. "Sync with master" may instruct the node to configure itself such that it or one or more of its components has the same configuration or firmware version as the master node of its group. "Latest" may instruct the node to configure itself such that it or one or more of its components has the same configuration or firmware version as the node in its group that was most recently changed. "Keep current" may instruct the node to not change its configuration or firmware (i.e., keep the same configuration that the node currently has). The "URI" field may identify the location of a set of files and/or the name of the resource that allows a node to update and/or configure itself. For example, the URI listed in the group policy informs a node where the files that can be used to perform the configuration.

In some embodiments, a group may have more than one policy that governs different components or aspects of the group's nodes. For example, policy 200b and 200c both govern nodes of the Finance group, as shown by the "Finance" Group ID. Continuing the example, policy 200b lists a component class of "iDRAC," meaning policy 200b may govern the iDRAC components of the nodes associated with the Finance Group. Policy 200c lists a component class of "NIC," meaning policy 200c may govern the network interface cards (NIC) of the nodes associated with the Finance Group. In some embodiments, a policy can govern updates or configuration for multiple or all components of nodes in a group. For example, policy 200a lists "All" in the "Component Class" field indicating that all components of nodes in the IT group are governed by policy 200a. In some embodiments, an administrator of system 100 may modify, change, update, or alter policies $P_A$-$_C$ and policies 200a-c depending on the requirements and needs of system 100 or desired outcomes.

In one example of operation of system 100, node $N_5$ may send a request to controller 140 to subscribe to event notifications for group 115a, and controller 140 may add node $N_5$ to group 115a. Node $N_2$ of group 115a may be changed (e.g., have its firmware updated) and may send a notification to controller 140. In response, controller 140 broadcasts a notification regarding the change to nodes $N_1$, $N_2$, $N_4$, and $N_5$ of group 115a. The notification may include configuration information of each node in group 115a. Nodes $N_1$, $N_2$, $N_4$, and $N_5$ then compare their own configuration information to the configuration information of the other nodes $N_1$, $N_2$, $N_4$, and $N_5$ of group 115a received in the notification. If a node, for example, node $N_5$ determines a difference between its configuration information and the configuration information of another node of group 115a, for example, node $N_2$, then it consults policy $P_A$ to determine what action to take. If policy $P_A$ indicates that node $N_5$ should update its firmware such that it has the same or similar firmware configuration as the master node (for example, "Sync with Master," as shown in policy 200a of FIG. 2), node $N_5$ will send a message to node $N_1$ to request a set of files to update its firmware such that it has the same or similar firmware configuration as master node $N_1$. After receiving the files, node $N_5$ will update its firmware according to the received set of files.

In some embodiments, nodes $N_1$-$N_9$ may communicate using servers (e.g., ZeroMQ, also known as ZMQ, 0MQ, or ØMQ, servers) and clients (e.g., those developed by IMATIX CORPORATION). For example, master node $N_1$ may include a ZeroMQ server while slave nodes $N_2$, $N_4$, and $N_5$ include ZeroMQ clients. Continuing the example, after a slave node, for example node $N_2$, determines a difference between its configuration information and the configuration information of another node in group 115a, for example node $N_1$, then node $N_2$ may start a ZMQ client and connect to node $N_1$ that has the new configuration information. Upon receiving the message from the ZMQ client, the ZMQ server of node $N_1$ copies the firmware image and/or configuration settings to the location defined by the URI field in group policy $P_A$ (e.g., policy 200a). The ZMQ server of node $N_1$ also sends a notification back to ZMQ client of node $N_2$ indicating that the files are ready to be retrieved.

Modifications, additions, or omissions may be made to the systems described herein without departing from the scope of the disclosure. For example, system 100 may include any number of nodes $N_1$-$N_9$, controllers 140, networks 160, chassis 110a-c, CMCs 120a-c, groups 115a-c, and policies $P_A$-$P_C$. The components may be integrated or separated. Moreover, the operations may be performed by more, fewer, or other components. Additionally, the operations may be performed using any suitable logic comprising software, hardware, and/or other logic.

Figure 3:
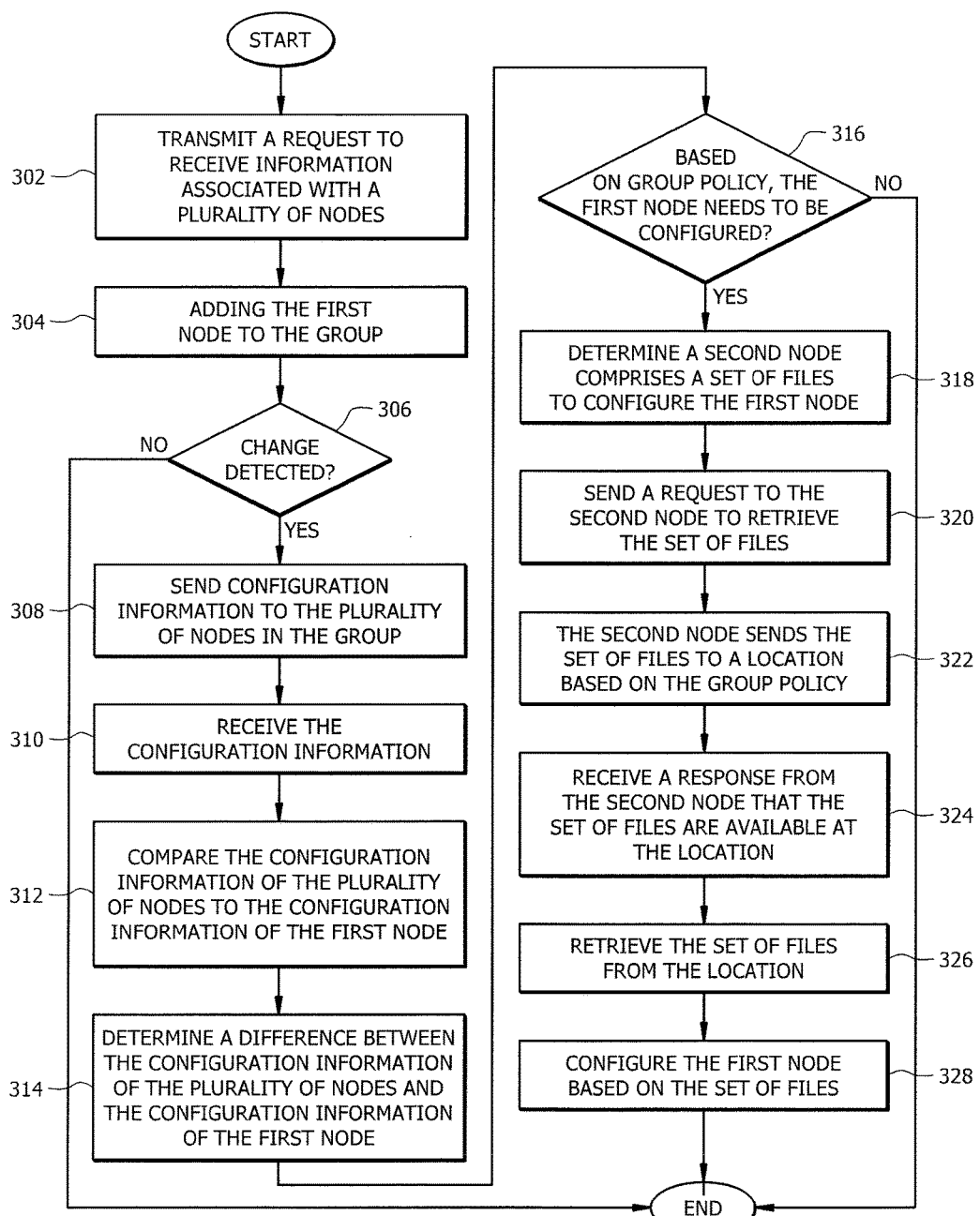
FIG. 3 is a flowchart describing an example of group-policy-based configuration.

FIG. 3 illustrates a flowchart describing an example of group-policy-based configuration. To illustrate examples of group-policy-based configuration, the steps of FIG. 3, described below, discuss some of the components of FIG. 1 and FIG. 4, although other components not illustrated in FIGS. 1 and 4 may be used. Although described as node $N_2$ performing some of the steps, each of nodes $N_1$-$N_9$ may be configured to perform these steps. At step 302, in some embodiments, node $N_2$ of system 100 transmits a request (e.g., a subscription request) to controller 140 to receive information associated with the nodes in group 115a.

In some embodiments, controller 140 may add node $N_2$ to group 115a at step 304. For example, if node $N_2$ is newly introduced to chassis 110a and requested at step 302 to receive information associated with the nodes in group 115a, controller 140 may add node $N_2$ to group 115a. Controller 140 may store the subscription in a list, lookup table, database, or any suitable data structure so that controller 140 may determine which nodes belong to which group. Although controller 140 may receive the request sent by the node and the node to the group, in some embodiments, one of CMCs 120a-c may be configured to receive a request and add a node to a group (e.g., if all of the nodes of the group are within the same chassis).

At step 306, in some embodiments, controller 140 determines whether a change occurs in the nodes of group 115a. If controller 140 does not determine a change, then the method may end. In some embodiments, controller 140 can continue to monitor system 100. If, at step 306 controller 140 determines that a change has occurred, the method continues to step 308. An example of a change detected at step 306 is node $N_5$ receiving a new network interface card (NIC) that includes a new configuration and new firmware. Although described as controller 140 determining whether a change occurs, in some embodiments, CMCs 120a-c may perform this action if all the nodes of a group are housed within one chassis (e.g., all the nodes are within chassis 110c).

At step 308, in some embodiments, controller 140 sends configuration information to the plurality of nodes in the group 115a. For example, if node $N_5$ of group 115a receives a new NIC, then controller 140 may send configuration information of node $N_5$ to nodes $N_1$, $N_2$, and $N_4$ in group 115a. In some embodiments, controller 140 sends configuration information of only the node or component that has undergone a change. For example, if node $N_5$ receives a new NIC, controller 140 may send configuration information of NIC or configuration information of the whole node $N_2$ to nodes in group 115a. In some embodiments, controller 140 sends configuration information of all of the nodes in group 115a. For example, if node $N_5$ receives a new NIC, controller 140 may send the configuration information of nodes $N_1$, $N_2$, $N_4$, and $N_5$ to nodes $N_1$, $N_2$, $N_4$, and $N_5$, such that each node has all of the configuration information of the nodes in group 115a. At step 310, in some embodiments, node $N_2$ receives the configuration information sent from controller 140 at step 308.

At step 312, in some embodiments, node $N_2$ compares the configuration information received at step 310 to its own configuration information. For example, node $N_2$ compares the configuration information of node $N_5$ to its own configuration information. At step 314, in some embodiments, node $N_2$ may determine a difference between the configuration information of the plurality of nodes and its own configuration information. The difference may include any dissimilarity between the configuration information, such as a difference between the configurations of the nodes, the firmware of the two nodes, the configurations of two of the same component type of the two nodes, or the firmware of two of the same component types of the two nodes. For example, if node $N_5$ receives a new NIC, then node $N_2$ determines that the firmware and configuration of its NIC is different the firmware and configuration of the NIC of node $N_5$. When comparing the configuration information and determining a difference, node $N_2$ may compare on a component by component basis (e.g., comparing the NIC configuration and firmware of node $N_2$ to the NIC configuration and firmware of node $N_5$).

At step 316, in some embodiments, node $N_2$ may determine, based on the group policy, whether it needs to be configured. For example, node $N_2$ of group 115a may be governed by policy 200a. After determining a difference between node $N_5$ and itself in step 314, node $N_2$ would determine, based on policy 200a, that it needs to update its NIC's firmware such that its NIC has the same firmware version as Master Node $N_9$ and update its NIC's configuration such that it has the same configuration as Master Node $N_9$. Node $N_2$ may make these determinations by consulting the "Firmware Update" and "Config. Update" fields of policy 200a, which both instruct the node to "Sync with Master." As another example, node $N_2$ may be governed by policies 200b-c (e.g., the iDRACs of node $N_2$ governed by policy 200b and the NICs of node $N_2$ governed by policy 200c). By consulting the "Firmware Update" field of policy 200c, node $N_2$ may determine that it needs to update the firmware of its NIC by ensuring its firmware is the same as the firmware of master node $N_1$ (e.g., "Sync with Master"). If, at step 316, the node determines that it needs to be configured, the method continues to step 318.

At step 318, in some embodiments, node $N_2$ determines that a second node comprises a set of files to configure the first node. Continuing the example from above, node $N_2$ may determine that node $N_1$ (e.g., the master node of group 115a) has the set of files that node $N_2$ may use to update the firmware of its NIC to be the same as the firmware of the master node's NIC (where the policy instructed that the firmware of the NIC is "sync[ed] with master"). In some embodiments, node $N_2$ may determine that node $N_5$ has most recently updated the configuration of its NIC where the policy instructed that the configuration of the NIC is to follow the "latest" configured NIC). As an additional example, if group 115a is governed by policy 200a (shown in FIG. 2), then node $N_5$ may determine at step 316 that all of its components need to be synced with master node $N_1$. Continuing with this example, at step 318 node $N_5$ may determine that master node $N_1$ comprises a set of files to update the firmware and update the configuration of all the components of node $N_5$.

At step 320, in some embodiments, node $N_2$ sends a request to node $N_1$ (which was determined in step 318), to retrieve a set of files to update the firmware of the NIC of node $N_2$. At step 324, in some embodiments, node $N_1$ sends the sets of files to a location, based on the group policy, so that node $N_2$ may access the set of files. For example, node $N_1$ (governed by policy 200b) may send a set of files to the URI listed in policy 200b so that node $N_2$ may access the set of files to update the firmware of the NIC of node $N_2$. As another example, if node $N_1$ is governed by policy 200a, node $N_1$ may determine that its policy does not have an associated URI. In this example, node $N_1$ may not perform step 322 and rather send the files directly to node $N_2$ that requested the files in step 320.

At step 324, in some embodiments, node $N_2$ may receive a response from node $N_1$ that the set of files are available at the location. For example, node $N_2$ may receive a response from node $N_1$ that the set of files to update the firmware of the NIC of node $N_2$ are located at ftp://custuri.nic.com (as shown in FIG. 2). In some embodiments, node $N_1$ may send node $N_2$ the actual URI where the files are located. In some embodiments, node $N_1$ may inform node $N_2$ that the set of files are available; afterwards, node $N_2$ may refer to a policy (e.g., policy 200b in FIG. 2) and determine the location of the set of files in the "URI" field.

At step 328, in some embodiments, node $N_2$ may retrieve a set of files from the location that the second node sent the set of files in step 324. For example, node $N_2$ may retrieve the files from the URI listed in policy 200b. In some embodiments, at step 330 node $N_2$ may be configured based on the set of files. For example, node $N_2$ may update the firmware of its NIC based on the set of files retrieved in step 324. After this, the method ends.

Modifications, additions, or omissions may be made to the methods described in FIG. 3 without departing from the scope of the disclosure. For example, the steps may be combined, modified, or deleted where appropriate, and additional steps may be added. For example, if a node sends directly to another node the set of files, then steps 322 and 324 may be omitted. Additionally, the steps may be performed in any suitable order without departing from the scope of the present disclosure. While discussed as node $N_2$ and controller 140 performing the steps, any suitable component of information handling system 100 may perform one or more of the steps.

FIG. 4 is a block diagram of selected elements of an embodiment of information handling system 400. Nodes $N_1$-$N_9$, controller 140, and CMCs 120a-c of FIG. 1 may be implemented using one or more information handling systems 400. In particular embodiments, information handling system 400 includes processor 402, memory 404, storage 406, input/output (I/O) interface 408, network interface card 410, controller 412, and bus 414. Although this disclosure describes and illustrates a particular information handling system having a particular number of particular components in a particular arrangement, this disclosure contemplates any suitable information handling system having any suitable number of any suitable components in any suitable arrangement.

Processor 402, in some embodiments, may comprise any system, device, or apparatus operable to interpret and/or execute program instructions and/or process data. Processor 402 may include one or more: microprocessors, microcontrollers, digital signal processors (DSP), graphical processing units (GPU), application specific integrated circuits (ASIC), or another digital or analog circuitry configured to interpret and/or execute program instructions and/or process data. In some embodiments, processor 402 may interpret and/or execute program instructions and/or process data stored locally (e.g., in memory modules 120a-c). In the same or alternative embodiments, processor 402 may interpret and/or execute program instructions and/or process data stored remotely. This disclosure contemplates processor 402 including any suitable number of any suitable internal registers, where appropriate. Where appropriate, processor 402 may include one or more arithmetic logic units (ALUs); be a multi-core processor; or include one or more processors 110. Although this disclosure describes and illustrates a particular processor, this disclosure contemplates any suitable processor. Although this disclosure describes and illustrates a particular processor, this disclosure contemplates any suitable processor.

Memory 404 may, in various embodiments, comprise any system, device, or apparatus operable to retain and/or retrieve program instructions and/or data (e.g., computer-readable media). Memory 404 may comprise one or more modules; such modules can include random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 400, is powered down. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to information handling system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Although this disclosure describes and illustrates particular storage, this disclosure contemplates any suitable storage.

In particular embodiments, I/O interface 408 includes hardware, software, or both, providing one or more interfaces for communication between information handling system 400 and one or more I/O devices. Information handling system 400 may include one or more of these I/O devices, where appropriate. One or more of these I/O devices may enable communication between a person and information handling system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. Although this disclosure describes and illustrates a particular I/O interface, this disclosure contemplates any suitable I/O interface.

In particular embodiments, network interface card (NIC) 410 includes hardware, software, or both providing one or more interfaces for communication (such as, for example, packet-based communication) between information handling system 400 and one or more other information handling systems 400 or one or more networks. As an example and not by way of limitation, NIC 410 may include a network adapter for communicating with an Ethernet or other wire-based network or a wireless NIC (WNIC) or wireless adapter for communicating with a wireless network, such as a WI-FI network. As an example and not by way of limitation, information handling system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Although this disclosure describes and illustrates a particular NIC, this disclosure contemplates any suitable NIC.

Controllers 412 may be implemented using any suitable device, system, or apparatus configured to monitor and/or manage one or more aspects of information handling system 400, such as storage 406. For example, controller 412 may include or may be a part of a DELL REMOTE ACCESS CONTROLLER (DRAC) or an INTEGRATED DELL REMOTE ACCESS CONTROLLER (iDRAC). In certain embodiments, controller 412 may enable an administrator or other user to remotely monitor and/or remotely manage one or more aspects of information handling system 400.

In particular embodiments, bus 414 includes hardware, software, or both coupling components of information handling system 400 to each other. As an example and not by way of limitation, bus 414 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Although this disclosure describes and illustrates a particular bus, this disclosure contemplates any suitable bus or interconnect.

In particular embodiments, one or more information handling systems 400 perform one or more steps of one or more methods described or illustrated herein. In particular embodiments, one or more information handling systems 400 provide the functionality described or illustrated herein. In particular embodiments, software running on one or more information handling systems 400 performs one or more steps of one or more methods described or illustrated herein or provides functionality described or illustrated herein. Particular embodiments include one or more portions of one or more information handling systems 400. Herein, reference to an information handling system may encompass a computing device, and vice versa, where appropriate. Moreover, reference to an information handling system may encompass one or more information handling systems, where appropriate.

This disclosure contemplates any suitable number of information handling systems 400. This disclosure contemplates information handling system 400 taking any suitable physical form. As an example and not by way of limitation, information handling system 400 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 400 may include one or more information handling systems 400, be unitary or distributed, span multiple locations, span multiple machines, span multiple data centers, or reside in a cloud, which may include one or more cloud components in one or more networks. Where appropriate, one or more information handling systems 400 may perform without substantial spatial or temporal limitation one or more steps of one or more methods described or illustrated herein. As an example and not by way of limitation, one or more information handling systems 400 may perform in real time or in batch mode one or more steps of one or more methods described or illustrated herein. One or more information handling systems 400 may perform at different times or at different locations one or more steps of one or more methods described or illustrated herein, where appropriate.

Modifications, additions, or omissions may be made to the systems described herein without departing from the scope of the disclosure. For example, information handling system 400 may include any number of processors 402, memories 404, storages 406, I/O interfaces 408, NICs 410, controllers 412, and buses 414. The components may be integrated or separated. Moreover, the operations may be performed by more, fewer, or other components. Additionally, the operations may be performed using any suitable logic comprising software, hardware, and/or other logic.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method, comprising:
   storing, at a first node of a plurality of nodes, a group policy;

transmitting, from the first node, a first request to receive information associated with the plurality of nodes, the plurality of nodes being governed by the group policy;

receiving, at the first node, sets of configuration information associated with the plurality of nodes, the sets of configuration information being received after a change has occurred regarding the plurality of nodes;

comparing, by the first node, the sets of configuration information associated with the plurality of nodes to configuration information associated with the first node;

determining, by the first node, a difference between the sets of configuration information associated with the plurality of nodes and the configuration information associated with the first node;

in response to determining the difference, determining, by the first node, to configure the first node based on analyzing content of the stored group policy;

in response to determining to configure the first node, determining, by the first node, a second node that stores a set of files to configure the first node, the second node being one of the plurality of nodes; and configuring, by the first node, the first node using the set of files stored at the second node.

2. The method of claim 1, further comprising:

sending a second request from a ZeroMQ client of the first node to a ZeroMQ server of the second node to retrieve the set of files;

receiving a response from the ZeroMQ server of the second node that the set of files are available at a location;

retrieving the set of files from the location; and wherein determining the second node that stores the set of files to configure the first node comprises:

determining, based on the group policy, that the first node needs to be configured according to a node of the plurality of nodes that has most recently been updated; and determining that the second node is the node of the plurality of nodes that has most recently been updated.

3. The method of claim 1, wherein:

a first set of the sets of configuration information comprises configuration information of a first component of one of the plurality of nodes;

determining the difference between the configuration information associated with the plurality of nodes and the configuration information associated with the first node comprises determining a difference between the configuration information of the first component of one of the plurality of nodes and the configuration information of a second component of the first node;

determining, based on the group policy, that the first node needs to be configured comprises determining, based on the group policy, that the second component of the first node needs to be configured;

determining the second node that stores the set of files to configure the first node comprises determining the second node that stores the set of files to configure the second component of the first node; and configuring the first node using the set of files stored at the second node comprises configuring the second component of the first node using the set of files stored at the second node.

4. The method of claim 1, further comprising:

sending a second request to the second node to retrieve the set of files;

receiving a response from the second node that the set of files are available at a location; and retrieving the set of files from the location.

5. The method of claim 4, wherein the second request sent to the second node to retrieve the set of files is sent from a ZeroMQ client and the response from the second node that the set of files are available at the location is received from a ZeroMQ server.

6. The method of claim 1, wherein:

a first set of configuration information comprises configuration information of a first component of one of the plurality of nodes;

the group policy comprises a first policy and a second policy, a second component of the first node and the first component of one of the plurality of nodes governed by the first policy, a fourth component of the first node and the third component of one of the plurality of nodes governed by the second policy;

determining the difference between the configuration information associated with the plurality of nodes and the configuration information associated with the first node comprises determining a difference between the configuration information of the first component of one of the plurality of nodes and the configuration information of the second component of the first node;

determining, based on the group policy, that the first node needs to be configured comprises determining, based on the first policy, that the second component of the first node needs to be configured;

determining the second node that stores the set of files to configure the first node comprises determining the second node that stores the set of files to configure the second component of the first node;

configuring the first node using the set of files stored at the second node comprises configuring the second component of the first node using the set of files stored at the second node;

the method further comprises:

comparing configuration information of the third component of one of the plurality of nodes to configuration information of the fourth component of the first node;

determining a difference between the configuration information of the third component of one of the plurality of nodes to configuration information of the fourth component of the first node; and in response to determining the difference, determining, based on the second policy, that the third component of the first node does not need to be configured.

7. The method of claim 1, wherein determining the second node that stores the set of files to configure the first node comprises:

determining, based on the group policy, that the first node needs to be configured according to a node of the plurality of nodes that has most recently been updated; and determining that the second node is the node of the plurality of nodes that has most recently been updated.

8. A system, comprising a processor of a first node of a plurality of nodes, the processor operable to:

store, in a memory of the first node, a group policy;

transmit, using an interface, a first request to receive information associated with the plurality of nodes, the plurality of nodes being governed by the group policy;

receive, using the interface, sets of configuration information associated with the plurality of nodes, the sets of configuration information being received after a change has occurred regarding the plurality of nodes;
compare the sets of configuration information associated with the plurality of nodes to configuration information associated with the first node;
determine a difference between the sets of configuration information associated with the plurality of nodes and the configuration information associated with the first node;
in response to determining the difference, determine, based on analyzing content of the stored group policy, to configure the first node;
in response to determining to configure the first node, determine a second node that stores a set of files to configure the first node, the second node being one of the plurality of nodes; and
configure the first node using the set of files stored at the second node.

9. The system of claim 8, wherein:
the processor is further operable to:
send, using the interface, a second request from a ZeroMQ client of the first node to a ZeroMQ server of the second node to retrieve the set of files;
receive, using the interface, a response from the ZeroMQ server of the second node that the set of files are available at a location; and
retrieve the set of files from the location; and
the processor determines the second node that stores the set of files to configure the first node by:
determining, based on the group policy, that the first node needs to be configured according to a node of the plurality of nodes that has most recently been updated; and
determining that the second node is the node of the plurality of nodes that has most recently been updated.

10. The system of claim 8, wherein:
a first set of the sets of configuration information comprises configuration information of a first component of one of the plurality of nodes;
the processor determines the difference between the configuration information associated with the plurality of nodes and the configuration information associated with the first node by determining a difference between the configuration information of the first component of one of the plurality of nodes and the configuration information of a second component of the first node;
the processor determines, based on the group policy, that the first node needs to be configured by determining, based on the group policy, that the second component of the first node needs to be configured;
the processor determines the second node that stores the set of files to configure the first node by determining the second node that stores the set of files to configure the second component of the first node; and
the processor configures the first node using the set of files stored at the second node by configuring the second component of the first node using the set of files stored at the second node.

11. The system of claim 8, wherein the processor is further configured to:
send, using the interface, a second request to the second node to retrieve the set of files;
receive, using the interface, a response from the second node that the set of files are available at a location; and
retrieve the set of files from the location.

12. The system of claim 11, wherein the second request sent to the second node to retrieve the set of files is sent from a ZeroMQ client and the response from the second node that the set of files are available at the location is received from a ZeroMQ server.

13. The system of claim 8, wherein:
a first set of configuration information comprises configuration information of a first component of one of the plurality of nodes;
the group policy comprises a first policy and a second policy, a second component of the first node and the first component of one of the plurality of nodes governed by the first policy, a fourth component of the first node and the third component of one of the plurality of nodes governed by the second policy;
the processor determines the difference between the configuration information associated with the plurality of nodes and the configuration information associated with the first node by determining a difference between the configuration information of the first component of one of the plurality of nodes and the configuration information of the second component of the first node;
the processor determines, based on the group policy, that the first node needs to be configured by determining, based on the first policy, that the second component of the first node needs to be configured;
the processor determines the second node that stores the set of files to configure the first node by determining the second node that stores the set of files to configure the second component of the first node; and
the processor configures the first node using the set of files stored at the second node comprises configuring the second component of the first node using the set of files stored at the second node; and
the processor is further operable to:
compare configuration information of the third component of one of the plurality of nodes to configuration information of the fourth component of the first node;
determine a difference between the configuration information of the third component of one of the plurality of nodes to configuration information of the fourth component of the first node; and
in response to determining the difference, determine, based on the second policy, that the third component of the first node does not need to be configured.

14. The system of claim 8, wherein the processor determines the second node that stores the set of files to configure the first node by:
determining, based on the group policy, that the first node needs to be configured according to a node of the plurality of nodes that has most recently been updated; and
determining that the second node is the node of the plurality of nodes that has most recently been updated.

15. A non-transitory computer readable storage medium comprising instructions, the instructions, when executed by a processor, executable to:
store a group policy;
transmit a first request to receive information associated with a plurality of nodes, the plurality of nodes being governed by the group policy;
receive sets of configuration information associated with the plurality of nodes, the sets of configuration information being received after a change has occurred regarding the plurality of nodes;

compare the sets of configuration information associated with the plurality of nodes to configuration information associated with a first node;
determine a difference between the sets of configuration information associated with the plurality of nodes and the configuration information associated with the first node;
in response to determining the difference, determine, based on analyzing content of the stored group policy, to configure the first node;
in response to determining to configure the first node, determine a second node that stores a set of files to configure the first node, the second node being one of the plurality of nodes; and
configure the first node using the set of files stored at the second node.

16. The non-transitory computer readable storage medium of claim 15, wherein:
the instructions are further executable to:
send a second request from a ZeroMQ client of the first node to a ZeroMQ server of the second node to retrieve the set of files;
receive a response from the ZeroMQ server of the second node that the set of files are available at a location; and
retrieve the set of files from the location; and
the instructions are executable to determine the second node that stores the set of files to configure the first node by:
determining, based on the group policy, that the first node needs to be configured according to a node of the plurality of nodes that has most recently been updated; and
determining that the second node is the node of the plurality of nodes that has most recently been updated.

17. The non-transitory computer readable storage medium of claim 15, wherein:
a first set of the sets of configuration information comprise configuration information of a first component of one of the plurality of nodes;
the instructions are executable to determine the difference between the configuration information associated with the plurality of nodes and the configuration information associated with the first node by determining a difference between the configuration information of the first component of one of the plurality of nodes and the configuration information of a second component of the first node;
the instructions are executable to determine, based on the group policy, that the first node needs to be configured by determining, based on the group policy, that the second component of the first node needs to be configured;
the instructions are executable to determine the second node that stores the set of files to configure the first node by determining the second node that stores the set of files to configure the second component of the first node; and
the instructions are executable to determine configuring the first node using the set of files stored at the second node by configuring the second component of the first node using the set of files stored at the second node.

18. The non-transitory computer readable storage medium of claim 15, wherein the instructions are further executable to:
send a second request to the second node to retrieve the set of files;
receive a response from the second node that the set of files are available at a location; and
retrieve the set of files from the location.

19. The non-transitory computer readable storage medium of claim 15, wherein:
a first set of configuration information comprises configuration information of a first component of one of the plurality of nodes;
the group policy comprises a first policy and a second policy, a second component of the first node and the first component of one of the plurality of nodes governed by the first policy, a fourth component of the first node and the third component of one of the plurality of nodes governed by the second policy;
the instructions are executable to determine the difference between the configuration information associated with the plurality of nodes and the configuration information associated with the first node by determining a difference between the configuration information of the first component of one of the plurality of nodes and the configuration information of the second component of the first node;
the instructions are executable to determine, based on the group policy, that the first node needs to be configured by determining, based on the first policy, that the second component of the first node needs to be configured;
the instructions are executable to determine the second node that stores the set of files to configure the first node by determining the second node that stores the set of files to configure the second component of the first node; and
the instructions are executable to configure the first node using the set of files stored at the second node by configuring the second component of the first node using the set of files stored at the second node; and
the instructions are further executable to:
compare configuration information of the third component of one of the plurality of nodes to configuration information of the fourth component of the first node;
determine a difference between the configuration information of the third component of one of the plurality of nodes to configuration information of the fourth component of the first node; and
in response to determining the difference, determine, based on the second policy, that the third component of the first node does not need to be configured.

20. The non-transitory computer readable storage medium of claim 15, wherein the instructions are executable to determine the second node that stores the set of files to configure the first node by:
determining, based on the group policy, that the first node needs to be configured according to a node of the plurality of nodes that has most recently been updated; and
determining that the second node is the node of the plurality of nodes that has most recently been updated.

21. The method of claim 1, further comprising:
storing, at a third node of a plurality of nodes, a group policy;
transmitting, from the third node, a first request to receive information associated with the plurality of nodes, the plurality of nodes being governed by the group policy;

receiving, at the third node, sets of configuration information associated with the plurality of nodes, the sets of configuration information being received after a change has occurred regarding the plurality of nodes;

comparing the sets of configuration information associated with the plurality of nodes to configuration information associated with the third node;

determining a difference between the sets of configuration information associated with the plurality of nodes and the configuration information associated with the third node;

in response to determining the difference, determining, based on analyzing content of the stored group policy, not to configure the third node.

22. The system of claim 8, wherein the processor is further configured to:

store, at a third node of a plurality of nodes, a group policy;

transmit, from the third node, a first request to receive information associated with the plurality of nodes, the plurality of nodes being governed by the group policy;

receive, at the third node, sets of configuration information associated with the plurality of nodes, the sets of configuration information being received after a change has occurred regarding the plurality of nodes;

compare the sets of configuration information associated with the plurality of nodes to configuration information associated with the third node;

determine a difference between the sets of configuration information associated with the plurality of nodes and the configuration information associated with the third node;

in response to determining the difference, determine, based on analyzing content of the stored group policy, not to configure the third node.

23. The non-transitory computer readable storage medium of claim 15, wherein the instructions are further executable to:

store, at a third node of a plurality of nodes, a group policy;

transmit, from the third node, a first request to receive information associated with the plurality of nodes, the plurality of nodes being governed by the group policy;

receive, at the third node, sets of configuration information associated with the plurality of nodes, the sets of configuration information being received after a change has occurred regarding the plurality of nodes;

compare the sets of configuration information associated with the plurality of nodes to configuration information associated with the third node;

determine a difference between the sets of configuration information associated with the plurality of nodes and the configuration information associated with the third node;

in response to determining the difference, determine, based on analyzing content of the stored group policy, not to configure the third node.

* * * * *